United States Patent
Cho et al.

(10) Patent No.: US 9,721,533 B2
(45) Date of Patent: Aug. 1, 2017

(54) IMAGE COMPENSATING DEVICE AND DISPLAY DEVICE HAVING THE SAME

(71) Applicant: SAMSUNG DISPLAY CO., LTD., Yongin-si, Gyeonggi-Do (KR)

(72) Inventors: Hyun-Min Cho, Seoul (KR); Jae-Byung Park, Seoul (KR); Jae-Woong Kang, Jeonju-si (KR); Jong-Hyuk Kang, Suwon-si (KR); Hyun-Deok Im, Seoul (KR); Sung-Jin Hong, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/003,471

(22) Filed: Jan. 21, 2016

(65) Prior Publication Data

US 2017/0011712 A1   Jan. 12, 2017

(30) Foreign Application Priority Data

Jul. 6, 2015   (KR) ......................... 10-2015-0096014

(51) Int. Cl.
*G09G 5/06*   (2006.01)
*G09G 3/20*   (2006.01)
(Continued)

(52) U.S. Cl.
CPC ................. *G09G 5/06* (2013.01); *A63B 3/00* (2013.01); *G06F 3/147* (2013.01); *G09G 3/2003* (2013.01);
(Continued)

(58) Field of Classification Search
CPC ....... G09G 5/06; G09G 3/2003; G09G 3/2092
(Continued)

(56) References Cited

U.S. PATENT DOCUMENTS 6,160,576 A * 12/2000 Higuchi .................. G06T 5/001
                                                                348/62
2002/0172416 A1* 11/2002 Sugiyama ................ H04N 1/60
                                                                382/162
(Continued)

FOREIGN PATENT DOCUMENTS

| KR | 1020000039248 | 7/2000 |
| KR | 1020000074925 | 12/2000 |
| KR | 1020080068475 | 7/2008 |
| KR | 1020140109100 | 9/2014 |
| KR | 1020140142417 | 12/2014 |

OTHER PUBLICATIONS

PL Turner, et al., "Circadian photoreception: ageing and the eye's important role in systemic health," Br J Ophthalmol 2008; 92:1439-1444, (http://bjo.bmj.com/content/92/11/1439.full).

(Continued)

*Primary Examiner* — Kimberly A Williams
(74) *Attorney, Agent, or Firm* — F. Chau & Associates, LLC

(57) ABSTRACT

An image compensating device includes a transmission ratio calculator configured to output a red transmission ratio of a user's crystalline lens, a green transmission ratio of the crystalline lens, and a blue transmission ratio of the crystalline lens based on the user's age, and a compensator configured to receive red input data, green input data, and blue input data and compensate the red input data, the green input data, and the blue input data based on the red transmission ratio, the green transmission ratio, and the blue transmission ratio.

14 Claims, 5 Drawing Sheets

(51) Int. Cl.
*A63B 3/00* (2006.01)
*G06F 3/147* (2006.01)
(52) U.S. Cl.
CPC ..... *G09G 3/2092* (2013.01); *G09G 2310/027* (2013.01); *G09G 2310/08* (2013.01); *G09G 2320/0242* (2013.01); *G09G 2320/0261* (2013.01); *G09G 2320/0666* (2013.01); *G09G 2320/08* (2013.01); *G09G 2340/14* (2013.01); *G09G 2354/00* (2013.01)
(58) Field of Classification Search
USPC ....... 345/589, 593, 600, 601, 606, 612, 619; 382/162, 167
See application file for complete search history.

(56) References Cited

U.S. PATENT DOCUMENTS

| 2015/0161933 | A1* | 6/2015 | Wu ..................... G09G 3/2011 345/690 |
| 2016/0213249 | A1* | 7/2016 | Cornsweet ............... A61B 3/12 |
| 2016/0220108 | A1* | 8/2016 | Ono ..................... A61B 3/0025 |

OTHER PUBLICATIONS

Adam Elias Broendstead, et al., "Human lens transmission of blue light: a comparison of autofluorescence based and direct spectral transmission determination," Ophthalmic Res 2011:46:118-124, (http://www.ncbi.nlm.nih.gov/pubmed/21325874).

* cited by examiner

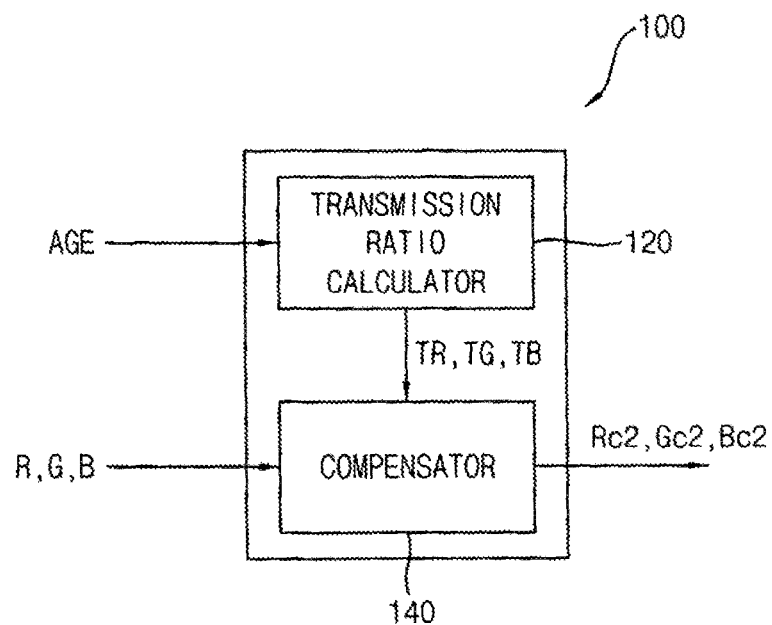

IMAGE COMPENSATING DEVICE AND DISPLAY DEVICE HAVING THE SAME

CROSS-REFERENCE TO RELATED APPLICATION(S)

This application claims priority under 35 USC §119 from, and the benefit of, Korean Patent Application No. 10-2015-0096014, filed on Jul. 6, 2015 in the Korean Intellectual Property Office (KIPO), the contents of which are herein incorporated by reference in their entirety.

BACKGROUND

1. Technical Field

Exemplary embodiments are directed to an image compensating device. More particularly, embodiments of the present inventive are directed to an image compensating device and a display device having the same.

2. Discussion of the Related Art

The lens of a human eye is commonly known as a crystalline lens due to the presence of crystallins, a water-soluble structural protein found in the lens and the cornea of the eye that accounts for the transparency of the structure. A transmission ratio of a crystalline lens may change with age. A person may perceive image quality and color of an image displayed on a display device, such as a television or a monitor, differently, depending on the transmission ratio of his/her crystalline lens. Thus, an image output from a display device may not be adjusted to a human viewer whose eyes have degenerated.

SUMMARY

Some exemplary embodiments provide an image compensating device that can compensate an image based on a user's age.

Some exemplary embodiments provide a display device that can compensate an image based on a user's age.

According to an exemplary embodiment, an image compensating device includes a transmission ratio calculator configured to output a red transmission ratio of a user's crystalline lens, a green transmission ratio of the crystalline lens, and a blue transmission ratio of the crystalline lens based on the user's age, and a compensator configured to receive red input data, green input data, and a blue input data and to compensate the red input data, the green input data, and the blue input data based on the red transmission ratio, the green transmission ratio, and the blue transmission ratio.

In exemplary embodiments, the compensator includes a first compensator configured to compensate ratios of the red input data, the green input data, and the blue input data based on the blue transmission ratio and to output a first red compensated data, a first green compensated data, and a first blue compensated data, and a second compensator configured to compensate the first red compensated data, the first green compensated data, and the first blue compensated data based on the blue transmission ratio and to output a second red compensated data, a second green compensated data, and a second blue compensated data.

In exemplary embodiments, the first compensator calculates the first red compensated data Rc1 from $$Rc1 = \frac{TB}{TR} \times R,$$

where R is the red input data, TB is the blue transmission ratio, and TR is the red transmission ratio.

In exemplary embodiments, the first compensator calculates the first green compensated data Gc1 from $$Gc1 = \frac{TB}{TG} \times G,$$

where G is the green input data, TB is the blue transmission ratio, and TG is the green transmission ratio.

In exemplary embodiments, the second compensator calculates the second red compensated data Rc2 from $$Rc2 = \frac{1}{TB} \times Rc1,$$

where Rc1 is the first red compensated data, and TB is the blue transmission ratio.

In exemplary embodiments, the second compensator calculates the second green compensated data Gc2 from $$Gc2 = \frac{1}{TB} \times Gc1,$$

where Gc1 is the first green compensated data, and TB is the blue transmission ratio.

In exemplary embodiments, the second compensator calculates the second blue compensated data Bc2 from $$Bc2 = \frac{1}{TB} \times Bc1,$$

where Bc1 is the first compensated data, and TB is the blue transmission ratio.

In exemplary embodiments, the transmission ratio calculator includes a lookup table (LUT) that stores the red transmission ratio, the green transmission ratio, and the blue transmission ratio corresponding to certain ages, and an interpolator configured to calculate the red transmission ratio, the green transmission ratio, and the blue transmission ratio for user ages not stored in the LUT using interpolation based on red, green, and blue transmission ratios of user ages stored in the LUT.

According to an exemplary embodiment, a display device may includes a display panel that includes a plurality of pixels, an image compensator configured to calculate a red transmission ratio of a user's crystalline lens, a green transmission ratio of the crystalline lens, and a blue transmission ratio of the crystalline lens based on the user's age and compensate a red input data, a green input data, and a blue input data received by the display panel based on the red transmission ratio, a green transmission ratio, and a blue transmission ratio, a scan driver configured to provide a scan signal to the pixels, a data driver configured to provide a data signal to the pixels, and a timing controller configured to generate a control signal that controls the image compensator, the scan driver, and the data driver.

In exemplary embodiments, the image compensator includes a transmission ratio calculator configured to calculate the red transmission ratio of the crystalline lens, the green transmission ratio of the crystalline lens, and the blue transmission ratio of the crystalline lens based on the user's age, and a compensator configured to compensate the red input data, the green input data, and the blue input data based on the red transmission ratio, the green transmission ratio, and the blue transmission ratio.

In exemplary embodiments, the compensator includes a first compensator configured to compensate ratios of the red input data, the green input data, and the blue input data based on the blue transmission ratio and to output a first red compensated data, a first green compensated data, and a first blue compensated data, and a second compensator configured to compensate the first red compensated data, the first green compensated data, and the first blue compensated data based on the blue transmission ratio, and to output a second red compensated data, a second green compensated data, and a second blue compensated data.

In exemplary embodiments, the first compensator calculates the first red compensated data Rc1 from $$Rc1 = \frac{TB}{TR} \times R,$$

where R is the red input data, TB is the blue transmission ratio, and TR is the red transmission ratio.

In exemplary embodiments, the first compensator calculates the first green compensated data Gc1 from $$Gc1 = \frac{TB}{TG} \times G,$$

where G is the green input data, TB is the blue transmission ratio, and TG is the green transmission ratio.

In exemplary embodiments, the second compensator calculates the second red compensated data Rc2 from $$Rc2 = \frac{1}{TB} \times Rc1,$$

where Rc1 is the first red compensated data, and TB is the blue transmission ratio.

In exemplary embodiments, the second compensator calculates the second green compensated data Gc2 from $$Gc2 = \frac{1}{TB} \times Gc1,$$

where Gc1 is the first green compensated data, and TB is the blue transmission ratio.

In exemplary embodiments, the second compensator calculates the second blue compensated data Bc2 from $$Bc2 = \frac{1}{TB} \times Bc1,$$

where Bc1 is the first compensated data, and TB is the blue transmission ratio.

In exemplary embodiments, the transmission calculator includes a lookup table (LUT) that stores the red transmission ratio, the green transmission ratio, and the blue transmission ratio corresponding to certain user ages, and an interpolator configured to calculate the red transmission ratio, the green transmission ratio, and the blue transmission ratio for user ages not stored in the LUT using interpolation based on red, green, and blue transmission ratios of user ages stored in the LUT.

In exemplary embodiments, the image compensator may be included in the timing controller or be coupled to the timing controller.

According to an exemplary embodiment, an image compensating device includes a transmission ratio calculator configured to output a red transmission ratio of a user's crystalline lens, a green transmission ratio of the crystalline lens, and a blue transmission ratio of the crystalline lens based on the user's age, wherein the transmission ratio calculator includes a lookup table (LUT) that stores the red transmission ratio, the green transmission ratio, and the blue transmission ratio corresponding to certain user ages, and an interpolator configured to calculate the red transmission ratio, the green transmission ratio, and the blue transmission ratio for user ages not stored in the LUT using interpolation based on red, green, and blue transmission ratios of user ages stored in the LUT.

In exemplary embodiments, the image compensating device includes a compensator configured to receive red input data, green input data, and blue input data and that includes a first compensator configured to compensate ratios of the red input data, the green input data, and the blue input data based on the blue transmission ratio and to output a first red compensated data, a first green compensated data, and a first blue compensated data, and a second compensator configured to compensate the first red compensated data, the first green compensated data, and the first blue compensated data based on the blue transmission ratio and to output a second red compensated data, a second green compensated data, and a second blue compensated data.

Therefore, an image compensating device and a display device having the same according to exemplary embodiments may display an image that adjusts to a user by compensating an image data based on a transmission ratio of a crystalline lens according to an age of the user.

BRIEF DESCRIPTION OF THE DRAWINGS

FIG. 1 is a block diagram that illustrates an image compensating device according to exemplary embodiments.

FIG. 2 is a block diagram that illustrates a compensator included in an image compensating device of FIG. 1.

FIG. 6 is implemented as a smart phone.

DETAILED DESCRIPTION OF EXEMPLARY EMBODIMENTS

Hereinafter, exemplary embodiments of the present inventive concept will be described in detail with reference to the accompanying drawings.

FIG. 1 is a block diagram that illustrates an image compensating device according to exemplary embodiments.

Figure 3:
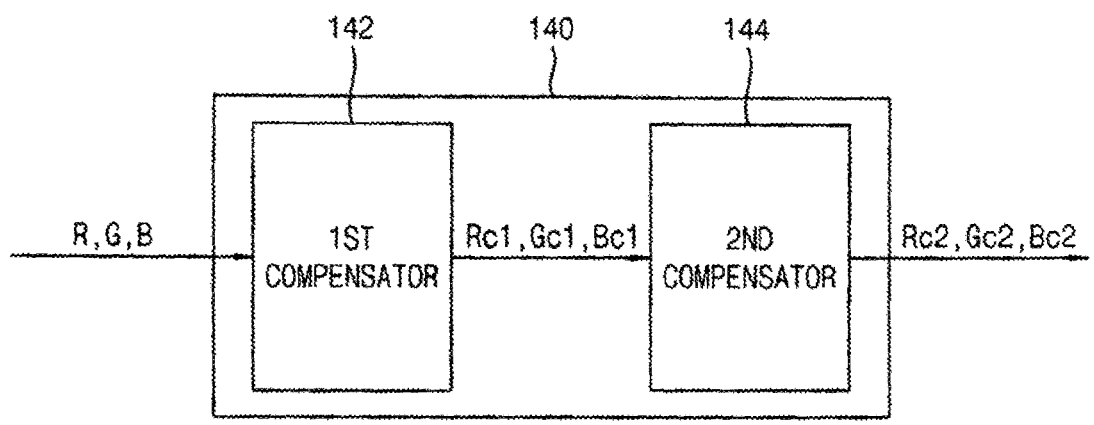
FIG. 3 is a block diagram of a transmission ratio calculator included in an image compensating device of FIG. 1.

FIG. 2 is a block diagram that illustrates a compensator included in the image compensating device of FIG. 1. FIG. 3 is a block diagram of a transmission ratio calculator included in the image compensating device of FIG. 1.

Referring to FIG. 1, an image compensating device 100 includes a transmission ratio calculator 120 and a compensator 140.

According to an embodiment, the transmission ratio calculator 120 can calculate a red transmission ratio TR of a crystalline lens, a green transmission ratio TG of the crystalline lens, and a blue transmission ratio TB of the crystalline lens, based on an age of a user. The transmission ratio calculator 120 receives the user's age AGE. The user can input his/her age AGE using an input device such as a keyboard or a keypad coupled to the image compensating device 100. Alternatively, the transmission ratio calculator 120 can determine the user's age AGE from a photograph of the user's face or eyeball received from a camera.

According to an embodiment, the transmission ratio calculator 120 includes a lookup table (LUT) 122. Referring to FIG. 2, the lookup table 122 can store the red transmission ratio TR, the green transmission ratio TG, and the blue transmission ratio TB corresponding to the user's age AGE. The transmission ratio of a crystalline lens typically decreases with age. Further, the red transmission ratio TR, the green transmission ratio TG, and the blue transmission ratio TB may differ from each other. Here, the red transmission ratio TR, the green transmission ratio TG, and the blue transmission ratio TB can be predetermined by being measured prior to storage. For example, for a user whose age AGE is 30, the transmission ratio calculator 120 can output TR30 as the red transmission ratio TR, TG30 as the green transmission ratio TG, and TB30 as the blue transmission. In FIG. 2, the transmission ratios are determined with respect to those of a 10-year old viewer, for whom the transmission ratios are defined to be one for all colors, i.e., red, green, and blue.

According to an embodiment, the transmission ratio calculator 120 further includes an interpolator. The interpolator can calculate values of the red transmission ratio TR, the green transmission ratio TG, and the blue transmission ratio TB that are not stored in the lookup table 122. Specifically, the interpolator can calculate the red transmission ratio TR, the green transmission ratio TG, and the blue transmission ratio TB by interpolation when the age AGE received from the input device or the camera is not stored in the lookup table 122. For example, the interpolator can calculate the red ratio for a 25 year old person by interpolating the red transmission ratio for age 20 and the red transmission ratio for age 30 when 25 is the user's age AGE. For example, when the red transmission ratio for age 20 TR20 is 0.9 and the red transmission ratio for age 30 TR30 is 0.8, the red transmission ratio for age 25 TR25 may be 0.85, which in this case is both a median value and a mean value of the red transmission ratio for age 20 TR20 and the red transmission ratio for age 30 TR30. The interpolator can calculate the green transmission ratio for age 25 TG25 and the blue transmission ratio for age 25 TB25 using the same method as used to calculate the red transmission ratio for age 25 TR25.

According to an embodiment, the compensator 140 receives red input data R, green input data G, and blue input data B and calculates red output data, green output data, and blue output data based on the red transmission ratio TR, the green transmission ratio TG, and the blue transmission ratio TB. For example, the red input data R may be a grayscale value corresponding to red image data, the green input data G may be a grayscale value corresponding to green image data, and the blue input data B may be a grayscale value corresponding to blue image data.

Referring to FIG. 3, according to an embodiment, the compensator 140 includes a first compensator 142 and a second compensator 144. The first compensator 142 compensates ratios of the red input data R, the green input data G, and the blue input data B based on the blue transmission ratio TB and outputs a first red compensated data Rc1, a first green compensated data Gc1, and a first blue compensated data Bc1. The brightness of the red input data R, the green input data G, and the blue input data B perceived by a user may change because the red transmission ratio TR, the green transmission ratio TG, and the blue transmission ratio TB differ from each other. The first compensator 142 can compensate the ratio of the red input data R and the green input data G based on the blue transmission ratio TB. That is, the first compensator 142 can respectively compensate the red input data R, the green input data G, and the blue input data B when the red input data R, the green input data G, and the blue input data B are respectively decreased by each of the red transmission ratio TR, the green transmission ratio TG, and the blue transmission ratio TB. Specifically, the first compensator 142 can calculate the first red compensated data Rc1 based on Equation 1:

$$Rc1 = \frac{TB}{TR} \times R,  \qquad \text{[EQUATION 1]}$$

where TB is the blue transmission ratio, TR is the red transmission ratio, and the R is the red input data. The first compensator 142 can calculate the first green compensated data Gc1 based on Equation 2:

$$Gc1 = \frac{TB}{TG} \times G, \qquad \text{[EQUATION 2]}$$

where TB is the blue transmission ratio, and TG is the green transmission ratio. The first blue compensated data Bc1 is same as the blue input data B because the first compensator 142 compensates the red input data R, the green input data G, and the blue input data B based on the blue transmission ratio TB.

According to an embodiment, the second compensator compensates the first red compensated data Rc1, the first green compensated data Gc1, and the first blue compensated data Bc1 based on the blue color light transmission ratio and outputs a second red compensated data Rc2, a second green compensated data Gc2, and a second blue compensated data Bc2. The second compensator 144 compensates the first red compensated data Rc1, the first green compensated data Gc1, and the first blue compensated data Bc1 to compensate for the red input data R, the green input data G, and the blue input data B in the first compensator 142. That is, the first red compensated data Rc1, the first green compensated data Gc1, and the first blue compensated data Bc1 are compensated by dividing the first red compensated data Rc1, the first green compensated data Gc1, and the first blue compensated data Bc1 by the blue transmission ratio TB. Specifically, the second compensator 144 calculates the second red compensated data Rc2 by compensating the brightness of the first red compensated data Rc1 based on Equation 3:

$$Rc2 = \frac{1}{TB} \times Rc1, \quad \text{[EQUATION 3]}$$

where TB is the blue transmission ratio, and Rc1 is the first red compensated data. The second compensator 144 calculates the second green compensated data Gc2 by compensating the brightness of the first green compensated data Gc1 based on Equation 4:

$$Gc2 = \frac{1}{TB} \times Gc1, \quad \text{[EQUATION 4]}$$

where TB is the blue transmission ratio, and Gc1 is the first green compensated data. The second compensator 144 calculates the second blue compensated data Bc2 by compensating the brightness of the first blue compensated data Bc1 based on Equation 5:

$$Bc2 = \frac{1}{TB} \times Bc1, \quad \text{[EQUATION 5]}$$

where TB is the blue transmission ratio, and Bc1 is the first blue compensated data.

According to an embodiment, as described above, the image compensating device 100 of FIG. 1 outputs image data adjusted to the user's age AGE by calculating the red transmission ratio TR, the green transmission ratio TG, and the blue transmission ratio TB that correspond to the user's age AGE and compensating the ratios and the red input data R, the green input data G, and the blue input data B based on the red transmission ratio TR, the green transmission ratio TG, and the blue transmission ratio TB, respectively.

According to an embodiment, the first compensator controls the ratio of the input data using the equations 1, 2 and outputs the first compensated data. The second compensator controls the brightness of the first compensated data using the equation 3, 4, 5 and outputs the second compensated data. Thus, when an image compensating device according to an embodiment is included in an LCD device, the first compensator may be coupled to a timing controller to control the ratio of the input data and the second compensator may be coupled to a backlight controller to control the brightness of the first compensated data.

Figure 4A:
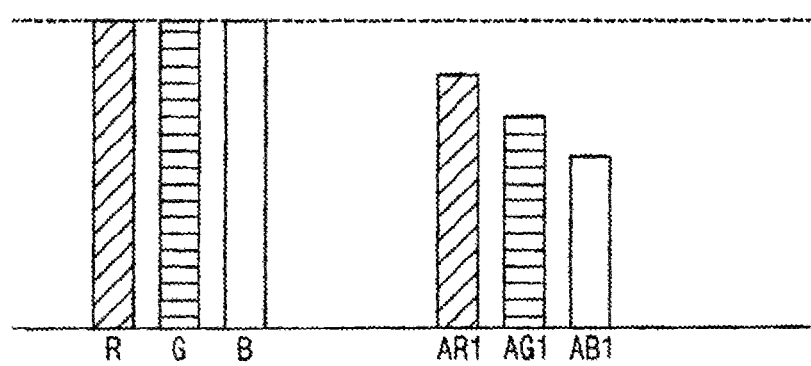
FIGS. 4A through 4C illustrate an operation of a compensator included in an image compensating device of FIG. 1.
Figure 4B:
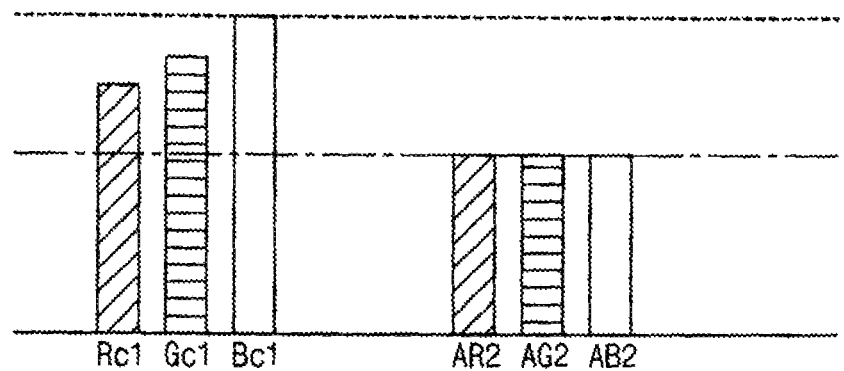
Figure 4C:
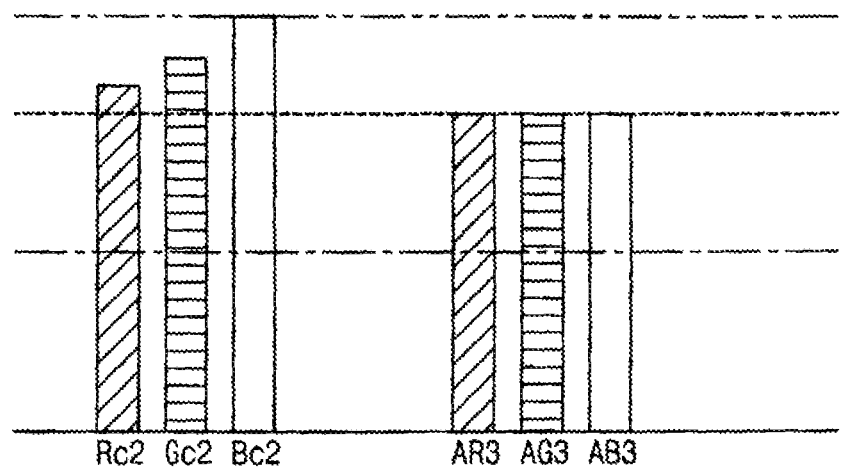

FIGS. 4A through 4C illustrate an operation of a compensator included in the image compensating device of FIG. 1, according to exemplary embodiments.

Referring to FIG. 4A, bars on the left side represent red input data R, green input data G, and blue input data B received by a compensator. Bars on the right side represent first red recognition data AR1, first green recognition data AG1, and first blue recognition data AB1 perceived by a user who is older than 10. For example, the red input data R may be a grayscale value corresponding to red image data, the green input data G may be a grayscale value corresponding to green image data, and the blue input data B may be a grayscale value corresponding to blue image data. The user may perceive the red input data R as the first red recognition data AR1 based on the red transmission ratio, the green input data G as the first green recognition data AG1 based on the green transmission ratio, and the blue input data B as the first blue recognition data AB1 based on the blue transmission ratio.

Referring to FIG. 4B, the bars on the left side represent a first red compensated data Rc1, a first green compensated data Gc1, and a first blue compensated data Bc1 calculated by the first compensator. The bars on the right side represent a second red recognition data AR2, a second green recognition data AG2, and a second blue recognition data AB2 perceived by a user who is older than 10. The first compensator compensates the red input data R to be the first red compensated data Rc1, the green input data G to be the first green compensated data Gc1, and the blue input data B to be the first blue compensated data Bc1 so that the second red recognition data AR2, the second green recognition data AG2, and the second blue recognition data AB2 have the same ratio. The first compensator compensates the red input data R to be the first red compensated data Rc1 based on Equation 1 and the green input data G to be the first green compensated data Gc1 based on Equation 2. Here, the blue input data B and the first blue compensated data Bc1 have the same value because the first compensator compensates the red input data R, the green input data G, and the blue input data B based on the t blue transmission ratio TB. A user older than 10 perceives the first red compensated data Rc1 as the second red recognition data AR2, the first green compensated data Gc1 as the second green recognition data AG2, and the first blue compensated data Bc1 as the second blue recognition data AB2.

Referring to FIG. 4C, the bars on the left side represent a second compensated data Rc2, a second green compensated data Gc2, and a second blue compensated data Bc2. The bars on the right side represent a third red recognition data AR3, a third green recognition data AG3, and a third blue recognition data AB3 perceived by a user older than 10. The second compensator compensates for values of the first red compensated data Rc1, the first green compensated data Gc1, and the first blue compensated data Bc1 that were decreased by the first compensator. The second compensator compensates the decreased values of the first red compensated data Rc1, the first green compensated data Gc1, and the first blue compensated data Bc1. The second compensator compensates the first red compensated data Rc1 to be the second red compensated data Rc2 based on Equation 3, the first green compensated data Gc1 to be the second green compensated data Gc2 based on Equation 4, and the first blue compensated data Bc1 to be the second blue compensated data Bc2 based on Equation 5. A user older than 10 perceives the second red compensated data Rc2 as the third recognition data AR3, the second green compensated data Gc2 as the third recognition data AG3, and the second blue compensated data Bc2 as the third recognition data AB3.

According to an embodiment, as described above, the compensator compensates the red input data R to be the second red compensated data Rc2, the green input data G to be the second green compensated data Gc2, and the blue input data B to be the second blue compensated data Bc2. Thus, a user may perceive the red input data R as the third red recognition data AR3, the green input data G as the third green recognition data AG3, and the blue input data B as the third blue recognition data AB3. Therefore, a user older than 10 can see the same image as a user younger than 10.

Although a compensator that compensates the ratio and brightness of red input data R, green input data G, and blue input data B using the blue transmission ratio TB is described above with reference to FIGS. 4A through 4C, embodiments are not limited thereto, and a compensator according to other embodiments may compensate the ratio of the brightness of the red input data R, the green input data G, and the blue input data B using the red transmission ratio TR or the green transmission ratio TG.

As described above the compensator can compensate the ratios and the values of the red input data R, the green input data G and the blue input data B based on the red transmission ratio, the green transmission ratio, and the blue transmission ratio of a user's eye lens based on the user's age. Thus, a display device that includes a compensator can display an image that adjusts to a user's age.

Figure 5:
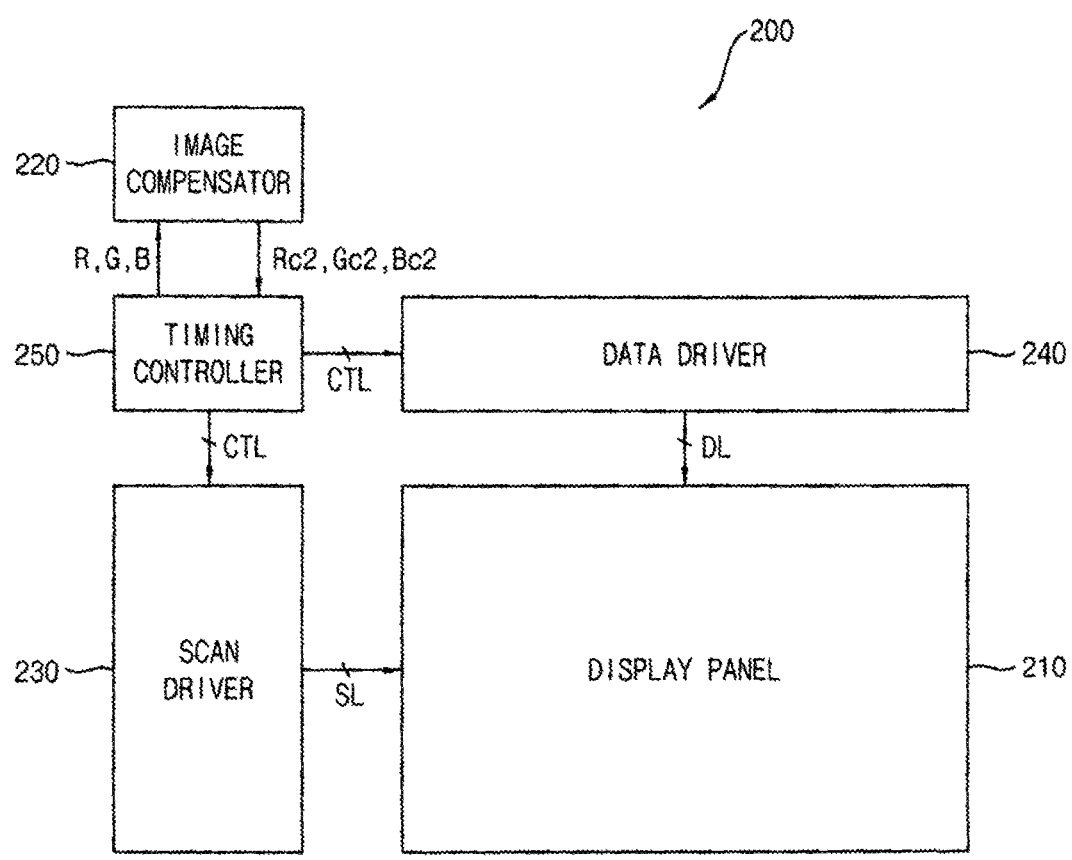
FIG. 5 is a block diagram that illustrates a display device according to exemplary embodiments.

FIG. 5 is a block diagram that illustrates a display device according to exemplary embodiments.

Referring to FIG. 5, a display device 200 includes a display panel 210, an image compensator 220, a scan driver 230, a data driver 240, and a timing controller 250.

According to an embodiment, the display panel 210 includes a plurality of pixels. A plurality of data lines DL and a plurality of scan lines SL are arranged on the display panel 210. The plurality of pixels are formed in intersection regions of the data lines DL and the scan lines SL. In some exemplary embodiments, when the display panel 210 is an organic light emitting diode display, each of the pixels may include an organic light emitting diode. For example, each of the pixels may include a pixel circuit, a driving transistor, and an organic light emitting diode. In this case, the driving transistor controls a driving current flowing through the organic light emitting diode based on a data signal received by the driving transistor from the data line DL in response to the scan signal, where the scan signal is received from the scan line SL. In other exemplary embodiments, when the display panel 210 is a liquid crystal display, each of the pixel may include a switching element, such as a thin film transistor (TFT), a liquid crystal capacitor formed from a liquid crystal layer, and a storage capacitor. In this case, the switching element provides the data signal received from the data line DL to the liquid crystal capacitor in response to the scan signal received from the scan line SL. The liquid crystal capacitor controls a light transmission ratio of the liquid crystal layer by being charged based on the data signal. The storage capacitor can maintain the charged voltage of the liquid crystal capacitor. When the display panel 210 includes a liquid crystal layer, the display device 200 includes a backlight unit. The backlight unit provides light to the display panel 210.

According to an embodiment, the scan driver 230 transmits the scan signal to the pixels through the plurality of scan lines SL, and the data driver 240 transmits the data signal to the pixels through the plurality of data line DL in response to the scan signal. The timing controller 250 generates control signals CTL that control the scan driver 230 and the data driver 240.

According to an embodiment, the image compensator 220 calculates a red transmission ratio of a crystalline lens, a green transmission ratio of the crystalline lens, and a blue transmission ratio of the crystalline lens by determining a user's age and compensates a red input data R, a green input data G, and a blue input data B transmitted to the pixels based on the red transmission ratio, the green transmission ratio, and the blue transmission ratio. Specifically, according to an embodiment, the image compensator 220 includes a transmission ratio calculator and a compensator. The transmission ratio calculator calculates the red transmission ratio, the green transmission ratio, and the blue transmission ratio based on the user's age. The transmission ratio calculator may receive the user's age. A user may input his/her age using an input device such as a keyboard or a keypad coupled to the image compensator 220. Alternatively, the transmission ratio calculator may determine a user's age using a photograph of the user's face or eyeball received from a camera. According to an embodiment, the transmission ratio calculator includes a lookup table that stores the red transmission ratio, the green transmission ratio, and the blue transmission ratio that correspond to a user's age. The transmission ratio calculator outputs from the lookup table the red transmission ratio, the green transmission ratio, and the blue transmission ratio corresponding to the user's age. According to an embodiment, the transmission ratio calculator can further include an interpolator that calculates, using interpolation, red transmission ratios, green transmission ratios, and blue transmission ratios that are not stored in the lookup table.

According to an embodiment, the compensator compensates red input data R, green input data G, and blue input data B based on the red transmission ratio, the green transmission ratio, and the blue transmission ratio. The compensator includes a first compensator and a second compensator. The first compensator compensates ratios of the red input data R, the green input data G, and the blue input data B based on the blue transmission ratioa, and outputs a first red compensated data, a first green compensated data, and a first blue compensated data. That is, the compensated red input data R, green input data G, and blue input data B calculated by the first compensator have the same ratio when the red input data R, the green input data G, and the blue input data B are each respectively decreased by the red transmission ratio, the green transmission ratio, and the blue transmission ratio, and when the red input data R, the green input data G, and the blue input data B propagate through a user's crystalline lens. The second compensator compensates the first red compensated data Rc1, the first green compensated data Gc1, and the first blue compensated data Bc1 based on the blue color light transmission ratio, and outputs a second red compensated data, a second green compensated data, and a second blue compensated data. That is, the second compensator compensates the first red compensated data, the first green compensated data, and the first blue compensated data received from the first compensator. In some exemplary embodiments, when the display panel 210 is an organic light emitting diode display, the second compensator compensates the first red compensated data, the first green compensated data, and the first blue compensated data by increasing a driving current flowing through each of the organic light emitting diodes. In other exemplary embodiments, when the display panel 210 is a liquid crystal display, the second compensator compensates the first red compensated data, the first green compensated data, and the first blue compensated data by increasing a light intensity of a backlight unit. Although FIG. 5 depicts the image compensator 220 as being coupled to the timing controller 250, embodiments are not limited thereto, and in other embodiments, the image compensator 220 may be disposed in the timing controller 250.

As described above, according to embodiments, the display device 200 compensates image data based on a user's age by including the image compensator 220. The image compensator 220 calculates the red transmission ratio, the green transmission ratio, and the blue transmission ratio of a user's crystalline lens based on the user's age user and compensates the ratio and values of the red input data R, the green input data G, and the blue input data B based on the red transmission ratio, the green transmission ratio, and the blue transmission ratio. Thus, a display device 200 that includes an image compensator 220 can output image data that adjusts to a user's age.

Figure 6:
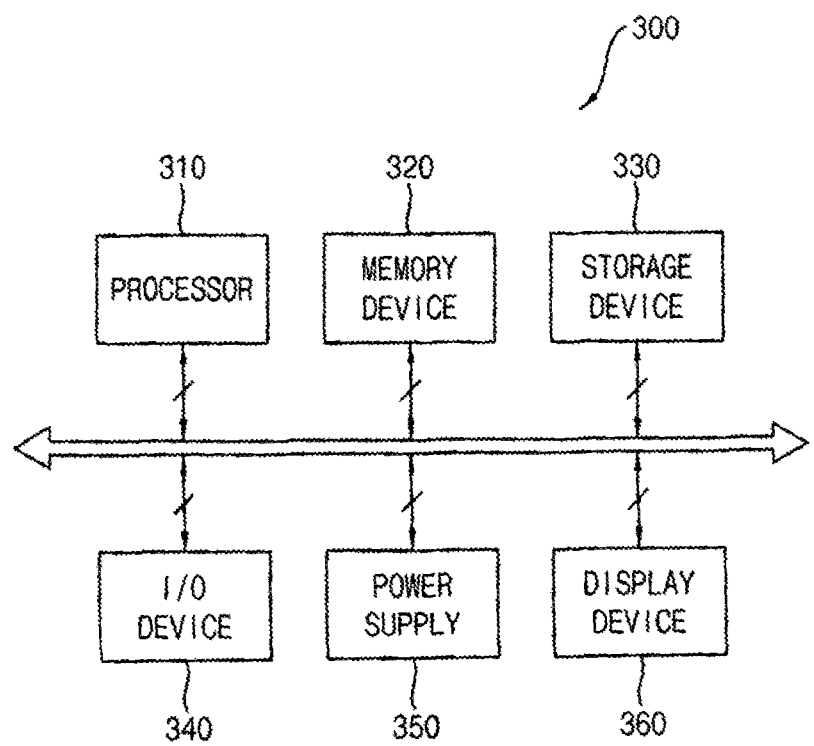
FIG. 6 is a block diagram that illustrates an electronic device that includes the display device of FIG. 5.
Figure 7:
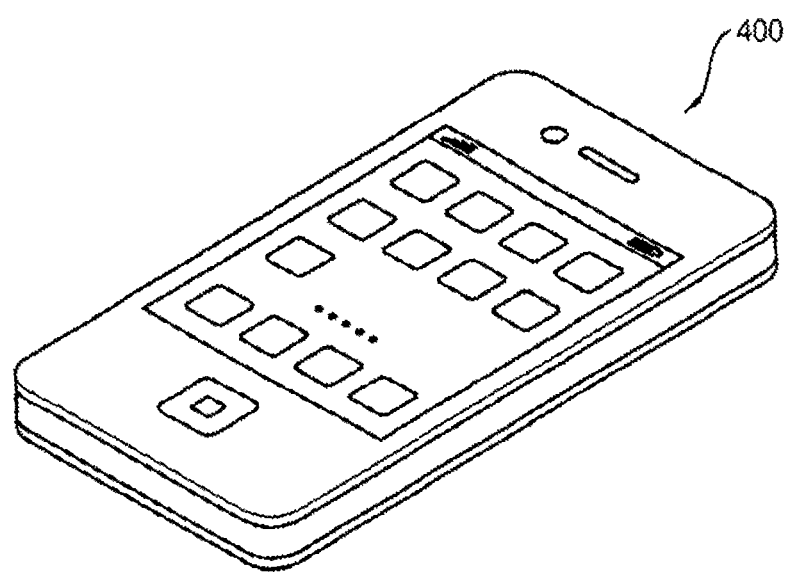
FIG. 7 illustrates an exemplary embodiment in which an electronic device

FIG. 6 is a block diagram that illustrates an electronic device that includes a display device of FIG. 5, and FIG. 7 is a diagram that illustrates an exemplary embodiment in which an electronic device of FIG. 6 is implemented as a smart phone.

Referring to FIGS. 6 and 7, an electronic device 300 includes a processor 310, a memory device 320, a storage device 330, an input/output (I/O) device 340, a power device 350, and a display device 360. Here, the display device 360 may correspond to the display device 100 of FIG. 1. In addition, the electronic device 200 further includes a plurality of ports for communicating with a video card, a sound card, a memory card, a universal serial bus (USB) device, and other electronic device, etc. Although FIG. 7 illustrates an electronic device 300 implemented as a smart-phone 400, embodiments are not limited thereto.

According to an embodiment, the processor 310 can perform various computing functions. The processor 310 may be a micro processor, a central processing unit (CPU), etc. The processor 310 is coupled to other components via an address bus, a control bus, a data bus, etc. Further, the processor 310 may be coupled to an extended bus, such as peripheral component interconnect (PCI) bus. The memory device 320 stores data for operations of the electronic device 200. For example, the memory device 320 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device, such as a dynamic random access memory (DRAM) device, a static random access memory (SRAM) device, a mobile DRAM device, etc. The storage device 330 may be a solid stage drive (SSD) device, a hard disk drive (HDD) device, a CD-ROM device, etc.

The I/O device 340 may be an input device such as a keyboard, a keypad, a touchpad, a touch-screen, a mouse, etc, and an output device such as a printer, a speaker, etc. In some exemplary embodiments, the display device 360 is included in the I/O device 340. The power device 350 provides power for operations of the electronic device 200. The display device 360 communicates with other components via the buses or other communication links. As described above, the display device 360 includes a display panel, an image compensator, a scan driver, a data driver, and a timing controller. The display panel includes a plurality of pixels. In some exemplary embodiments, the display panel is an organic light emitting diode in which each pixel includes an organic light emitting diode. The organic light emitting diode emits light based on a driving current. In other exemplary embodiments, the display panel is a liquid crystal display in which each pixel includes a liquid crystal layer. If the panel is a liquid crystal display, the display device 360 includes a backlight unit to provide light to the display panel. The scan driver provides a scan signal to the pixels through the scan lines. The data driver provides a data signal to the pixels through the data lines in response to the scan signal. The timing controller generates control signals that control the scan driver and the data driver. The image compensator receives the user's age, calculates the red transmission ratio, the green transmission ratio, and the blue transmission ratio, and compensates the red input data, the green input data and the blue input data provided to the pixels based on the red transmission ratio, the green transmission ratio, and the blue transmission ratio of the user's crystalline lens. The transmission ratio calculator may receive the user's age from an input device or a camera of an electronic device 300. The transmission ratio calculator includes a lookup table that stores the red transmission ratio, the green transmission ratio, and the blue transmission ratio. The transmission calculator may further include an interpolator that calculates using interpolation red transmission ratios, green transmission ratios, and blue transmission ratios that are not stored in the lookup table. The interpolator compensates red input data, green input data, and blue input data based on the red transmission ratio, the green transmission ratio, and the blue transmission ratio. The compensator includes a first compensator and a second compensator. The first compensator compensates red input data, green input data, the blue input data so that they have the same ratio when the red input data, the green input data, and the blue input data are decreased by different red, green and blue transmission ratios. The second compensator compensates the first red compensated data, the first green compensated data, and the first blue compensated data that are decreased by the first compensator. In some exemplary embodiments, when the display panel is an organic light emitting diode display, the second compensator compensates the first red compensated data, the first green compensated data, and the first blue compensated data by increasing the driving current flowing through the organic light emitting diode. In other exemplary embodiments, when the display panel is a liquid crystal display, the second compensator compensates the first red compensated data, the first green compensated data, and the first blue compensated data by increasing an intensity of light emitted from a backlight unit.

As described above, according to embodiments, the electronic device 300 of FIG. 6 includes the display device 360 that compensates image data based on a user's age. A display device 360 that includes an image compensator calculates the red transmission ratio, the green transmission ratio, and the blue transmission ratio of a user's crystalline lens based on the user's age, and compensates the ratio and brightness of the red input data, the green input data, and the blue input data based on the red transmission ratio, the green transmission ratio, and the blue transmission ratio. Thus, an electronic device 300 that includes a display device 360 can display an image that is adjustable for the user's age.

Embodiments of the present inventive concept used with a display device and an electronic device having the display device. For example, embodiments of the present inventive concept can be used with a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings of embodiments of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. An image compensating device comprising:
   a transmission ratio calculator configured to calculate a red transmission ratio of a user's crystalline lens, a green transmission ratio of the crystalline lens, and a blue transmission ratio of the crystalline lens based on the user's age; and
   a compensator configured to receive red input data, green input data, and blue input data and to compensate the red input data, the green input data, and the blue input data based on the red transmission ratio, the green transmission ratio, and the blue transmission ratio, wherein the compensated red input data, compensated green input data, and compensated blue input data are displayed by a display panel,
   wherein the compensator includes:
      a first compensator configured to compensate ratios of the red input data, the green input data, and the blue input data based on the blue transmission ratio and to output a first red compensated data, a first green compensate data, and a first blue compensated data; and
      a second compensator configured to compensate the first red compensated data, the first green compensated data, and the first blue compensated data based on the blue transmission ratio and to output a second red compensated data, a second green compensated data, and a second blue compensated data.

2. The image compensating device of claim 1, wherein the first compensator calculates the first red compensated data Rc1 from $$Rc1 = \frac{TB}{TR} \times R,$$

wherein R is the red input data, TB is the blue transmission ratio, and TR is the red transmission ratio.

3. The image compensating device of claim 1, wherein the first compensator calculates the first green compensated data Gc1 from $$Gc1 = \frac{TB}{TG} \times G,$$

wherein G is the green input data, TB is the blue transmission ratio, and TG is the green transmission ratio.

4. The image compensating device of claim 1, wherein the second compensator calculates the second red compensated data Rc2 from $$Rc2 = \frac{1}{TB} \times Rc1,$$

wherein Rc1 is the first red compensated data, and TB is the blue transmission ratio.

5. The image compensating device of claim 1, wherein the second compensator calculates the second green compensated data Gc2 from $$Gc2 = \frac{1}{TB} \times Gc1,$$

wherein Gc1 is the first green compensated data, and TB is the blue transmission ratio.

6. The image compensating device of claim 1, wherein the second compensator calculates the second blue compensated data Bc2 from $$Bc2 = \frac{1}{TB} \times Bc1,$$

wherein Bc1 is the first blue compensated data, and TB is the blue color light transmission ratio.

7. The image compensating device of claim 1, wherein the transmission ratio calculator includes
   a lookup table (LUT) that stores the red transmission ratio, the green transmission ratio, and the blue transmission ratio corresponding to certain user ages, and
   an interpolator configured to calculate the red transmission ratio, the green transmission ratio, and the blue transmission ratio for user ages not stored in the LUT using interpolation based on red, green, and blue transmission ratios of user ages stored in the LUT.

8. A display device comprising:
   a display panel that includes a plurality of pixels;
   an image compensator configured to calculate a red transmission ratio of a user's crystalline lens, a green transmission ratio of the crystalline lens, and a blue transmission ratio of the crystalline lens based on the user's age, and compensate red input data, green input data, and blue input data received by the display panel based on the red transmission ratio, the green transmission ratio, and the blue transmission ratio, wherein the compensated red input data, compensated green input data, and compensated blue input data are displayed by the display panel;
   a scan driver configured to provide a scan signal to the pixels;
   a data driver configured to provide a data signal to the pixels; and
   a timing controller configured to generate a control signal that controls the image compensator, the scan driver, and the data driver, wherein the image compensator is included in the timing controller or is coupled to the timing controller,
   wherein the image compensator includes:
      a transmission ratio calculator configured to calculate the red transmission ratio of the crystalline lens, the green transmission ratio of the crystalline lens, and the blue transmission ratio of the crystalline lens based on the user's age; and a compensator configured to compensate the red input data, the green input data, and the blue input data based on the red transmission ratio, the green transmission ratio, and the blue transmission ratio,
      wherein the compensator includes: a first compensator configured to compensate ratios of the red input data, the green input data, and the blue input data based on the blue transmission ratio and to output a first red compensated data, a first green compensated data, and a first blue compensated data; and
      a second compensator configured to compensate the first red compensated data, the first green compensated data, and the first blue compensated data based on the blue transmission ratio, and to output a second red compensated data, a second green compensated data, and a second blue compensated data.

9. The display device of claim 8, wherein the first compensator calculates the first red compensated data Rc1 from $$Rc1 = \frac{TB}{TR} \times R,$$

wherein R is the red input data, TB is the blue transmission ratio, and TR is the red transmission ratio.

10. The display device of claim 8, wherein the first compensator calculates the first green compensated data Gc1 from $$Gc1 = \frac{TB}{TG} \times G,$$

wherein G is the green input data, TB is the blue transmission ratio, and TG is the green transmission ratio.

11. The display device of claim 8, wherein the second compensator calculates the second red compensated data Rc2 from $$Rc2 = \frac{1}{TB} \times Rc1,$$

wherein Rc1 is the first red compensated data, and TB is the blue transmission ratio.

12. The display device of claim 8, wherein the second compensator calculates the second green compensated data Gc2 from $$Gc2 = \frac{1}{TB} \times Gc1,$$

wherein Gc1 is the first green compensated data, and TB is the blue transmission ratio.

13. The display device of claim 8, wherein the second compensator calculates the second blue compensated data Bc2 from $$Bc2 = \frac{1}{TB} \times Bc1,$$

where Bc1 is the first blue compensated data, and TB is the blue transmission ratio.

14. The display device of claim 8, wherein the transmission calculator includes
- a lookup table (LUT) that stores the red transmission ratio, the green transmission ratio, and the blue transmission ratio corresponding to certain user ages, and
- an interpolator configured to calculate the red transmission ratio, the green transmission ratio, and the blue transmission ratio for user ages not stored in the LUT using interpolation based on red, green, and blue transmission ratios of user ages stored in the LUT.

* * * * *